UNITED STATES PATENT OFFICE.

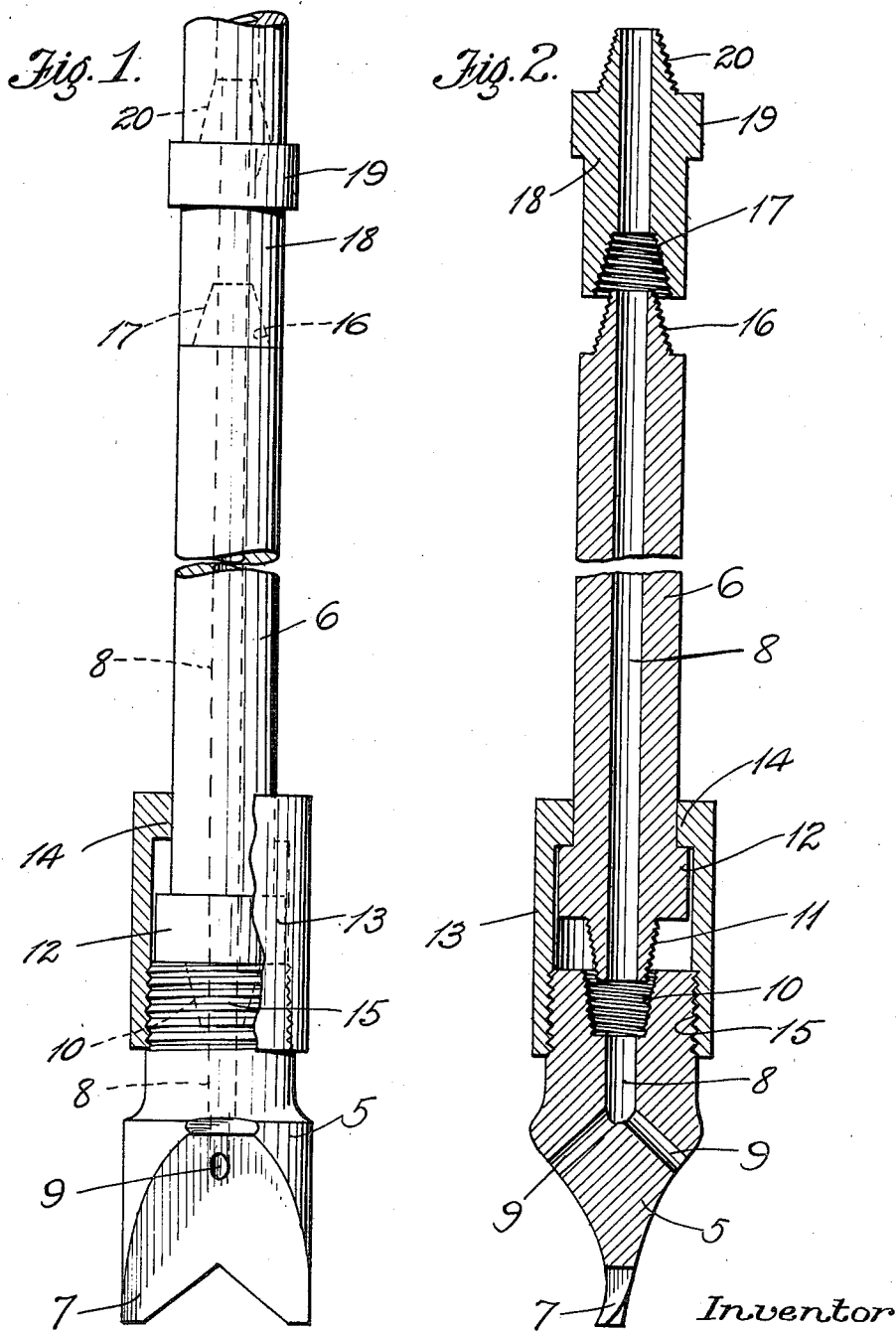

WILLIAM H. CRITTON, OF FELLOWS, CALIFORNIA.

DRILL.

1,030,387.  Specification of Letters Patent.  Patented June 25, 1912.

Application filed October 10, 1911. Serial No. 653,877.

*To all whom it may concern:*

Be it known that I, WILLIAM H. CRITTON, a citizen of the United States, residing at Fellows, in the county of Kern and State of California, have invented new and useful Improvements in Drills, of which the following is a specification.

This invention relates to improvements in drills and particularly drills that are adapted for boring wells for obtaining water, oil, or other substances from the earth, and it has particular relation to the manner of securing the drill or boring point to the actuating means which carries the same.

It is also an object of the invention to provide a boring tool with a stem adapted to carry the said boring tool, additional securing means being also provided for preventing the accidental separation of the bit or boring tool from said stem.

It is also an object of the invention to provide a drill bit with a carrying stem which is normally secured thereto by a screw joint, the said stem also carrying a reinforcing sleeve or coupling adapted to cover the joint between said parts, the said coupling being adapted to prevent the bit from becoming separated from said stem even though it should be unscrewed therefrom or be broken therefrom.

In the accompanying drawing forming a part of this specification, Figure 1 is a side elevation of a drill point or bit and the stem carrying the same, the coupling means at the joint between the parts being partially broken away and shown in section. Fig. 2 is a longitudinal sectional central view through the device.

The details and features of the invention will now be more particularly described, reference being had to the said drawing in which 5 indicates the body of a drill usually of the ordinary type and 6 a stem adapted to be secured thereto. The bit illustrated in the drawing is of the fish tail type having cutting points 7 and is made hollow having a central passage 8 and diverging outlets 9 leading therefrom. The said bit is also formed with a screw threaded socket 10 adapted to receive a screw threaded projection 11 upon the adjacent end of the stem 6. The said stem 6 is made hollow so as to be capable of delivering liquids to the hollow bit and the lower end of said stem is formed with an enlarged or shouldered portion 12 usually in the form of an annular thickened flange. A sleeve or coupling 12 is adapted to be slipped upon the upper end of the said stem 6 and is formed with an annular flange 14 extending inwardly from its upper end and arranged to fit against the shoulder 12 upon said stem. The lower end of the coupling 13 is interiorly threaded and adapted to engage exterior threads 15 formed upon the upper end of the bit. The upper end of the stem is also provided with screw threaded projection 16 adapted to engage a correspondingly threaded socket 17 formed in the adjacent end of a short stem coupling section 18. The said stem coupling section 18 is formed with an annular shoulder 19 for limiting the upward movement of the coupling or sleeve 13 when it is disconnected from the bit. The upper end of said stem coupling section 18 is also formed with a screw threaded projection 20 adapted to fit the usual drill piping by which the drill is lowered into the well and turned for boring the said well. The said section 18 is also hollow so that water for clearing the well of cuttings can be delivered from the piping carrying the drill, through the said stem section and stem and through the openings in the body of the bit to points near the cutting points of said bit.

The use of the sleeve or coupling 13 in connection with the shouldered stem is an important feature of the invention since the said coupling sleeve not only strengthens the parts as they are ordinarily connected but in the event of the stem 6 becoming unscrewed from the bit 5 as shown in Fig. 2, the said bit cannot be lost in the well since it will be held upon the stem by the said coupling. The same thing is true if the stem becomes broken from its connection with the said bit as frequently occurs. It will be seen that in such case it is only necessary to elevate the drill mechanism from the well in order to replace the bit in its normal position as shown in Fig. 1 or if the stem be broken to put in a new stem.

It will be understood that the screw threads upon the coupling 13 and the bit 5 may have either right hand or left hand threads as desired within the spirit of the invention.

It will be understood that it is needful for one end of the stem to be made no larger than the opening at the contracted end of the coupling or sleeve 13 or that the said stem be made in two parts so that it may be separated between the enlarged or shouldered portions thereof. The manner of forming the stem and bit makes it possible to secure a very strong and rigid connection between the parts and also prevents the possibility of loosing the bit or drill point in the well, which is frequently a source of great annoyance and difficulty and sometimes renders it impossible to go forward with the drilling of the well. The elongated stem employed also prevents the drill from becoming tipped in the bore of the well. The connection between the bit and the coupling 13 is also such that the said bit will not become twisted in the well even though the stem be broken, or unscrewed from the said bit.

What I claim is:—

A drill mechanism comprising a hollow stem having upper and lower sections removably connected, the said sections having annular limiting shoulders formed thereon, a coupling sleeve adapted to be slipped upon said hollow stem when the sections are separated, the annular limiting shoulders preventing the coupling from slipping from the stem, a bit having a neck portion adapted to be screwed into the lower end of said coupling, the said bit also having a socket adapted to be screwed onto the lower end of said stem, the structure being such that the coupling will prevent the loss of the bit if it becomes unscrewed or broken from the stem.

In witness that I claim the foregoing I have hereunto subscribed my name this 30th day of September, 1911.

WILLIAM H. CRITTON.

Witnesses:
E. A. REARDON,
H. K. BACON.